(12) United States Patent
Harley et al.

(10) Patent No.: US 7,266,306 B1
(45) Date of Patent: Sep. 4, 2007

(54) METHOD FOR OPTICAL CARRIER SUPPRESSION AND QUADRATURE CONTROL

(75) Inventors: James Harley, Nepean (CA); Kim Roberts, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 699 days.

(21) Appl. No.: 10/677,276

(22) Filed: Oct. 3, 2003

(51) Int. Cl.
*H04B 10/04* (2006.01)

(52) U.S. Cl. .................................... 398/182

(58) Field of Classification Search ............. 398/182, 398/185, 201, 192; 359/237
See application file for complete search history.

(56) References Cited

U.S. PATENT DOCUMENTS

| | | |
|---|---|---|
| 5,148,503 A | 9/1992 | Skeie |
| 5,301,058 A | 4/1994 | Olshansky |
| 5,311,346 A | 5/1994 | Haas et al. |
| 5,349,312 A | 9/1994 | Huettner et al. |
| 5,408,498 A | 4/1995 | Yoshida |
| 5,416,626 A | 5/1995 | Taylor |
| 5,446,574 A | 8/1995 | Djupsjobacka et al. |
| 5,513,029 A | 4/1996 | Roberts |
| 5,579,328 A | 11/1996 | Habel et al. |
| 5,761,225 A | 6/1998 | Fidric et al. |
| 5,892,858 A | 4/1999 | Vaziri et al. |
| 5,949,560 A | 9/1999 | Roberts et al. |
| 5,999,258 A | 12/1999 | Roberts |
| 6,067,180 A | 5/2000 | Roberts |
| 6,115,162 A | 9/2000 | Graves et al. |
| 6,124,960 A | 9/2000 | Garthe et al. |
| 6,128,111 A | 10/2000 | Roberts |
| 6,205,262 B1 | 3/2001 | Shen |
| 6,262,834 B1 | 7/2001 | Nichols et al. |
| 6,304,369 B1 | 10/2001 | Piehler |
| 6,441,932 B1 | 8/2002 | Helkey |

(Continued)

FOREIGN PATENT DOCUMENTS

EP  0 524 758   1/1993

(Continued)

OTHER PUBLICATIONS

Adaptive Electronic Linearization of Fiber Optic Links, OFC 2003, vol. 2, pp. 477-480, Mar. 2003 Sadhwani et al.

(Continued)

*Primary Examiner*—Shi K. Li
(74) *Attorney, Agent, or Firm*—Kent Daniels; Ogilvy Renault LLP

(57) ABSTRACT

A suppressed carrier optical communications signal is generated by driving (biasing) an optical modulator capable of complex modulation of an optical carrier signal to a bias point near a zero-crossing point of the modulator's E-field response. A complex input signal is then used to drive excursions of the E-field response to impress the input signal onto the optical carrier. The resulting lightwave emerging from the complex modulator exhibits an optical spectrum characterized by a pair of sidebands and a strongly suppressed carrier. Bias control of the complex modulator is implemented on the basis of the optical power detected at the output of the complex modulator. This enables the optical modulator to be treated as a "black box", in that calculation of the bias signals does not relay on knowledge of the precise performance characteristics of the modulator.

8 Claims, 6 Drawing Sheets

U.S. PATENT DOCUMENTS

| | | | |
|---|---|---|---|
| 6,473,013 | B1 | 10/2002 | Velazquez et al. |
| 6,559,994 | B1 | 5/2003 | Chen et al. |
| 6,580,532 | B1 | 6/2003 | Yao et al. |
| 7,035,486 | B2 * | 4/2006 | Griffin et al. .................. 385/3 |
| 2001/0028760 | A1 | 10/2001 | Yaffe |
| 2002/0018268 | A1 | 2/2002 | Price et al. |
| 2002/0024694 | A1 | 2/2002 | Newell et al. |
| 2002/0106148 | A1 | 8/2002 | Schemmann et al. |
| 2003/0011847 | A1 | 1/2003 | Dai Fa et al. |
| 2003/0175037 | A1 * | 9/2003 | Kimmitt et al. ............ 398/198 |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Automated Measurement of Polarization Mode Dispersion Using Jones Matrix Eigenanalysis, IEE Photonics Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-716, Herraez et al.

Design of Broad-Band PMD Compensation Filters, IEEE Photonics Technology Letters, vol. 14, No. 8, Aug. 2002, A. Eyal et al.

Dispersion Compensation by Active Predistorted Signal Synthesis, Journal of Lightwave Technology, vol. LT-3, No. 4, Aug. 1985, Thomas L. Koch and Rod C. Alferness.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

Exact Compensation for both Chromatic Dispersion and Kerr Effect in a Transmission Fiber Using Optical Phase Conjunction, Journal of Lightwave Technology, vol. 14, No. 3, March.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Effects in Lightwave Systems, Craig. D. Poole and Jonathan Nage. Date unknown.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 •m, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Reduction of Dispersion-Induced Distortion in SCM Transmission Systems by Using Predistortion-Linearized MQW-EA Modulatirs, Journal of Lightwave Technology, vol. 15, No. 2, Fe.

Representation of Second-Order Polarisation Mode Dispersion, Electronics Letters, vol. 35, No. 19, Sep. 16, 1999, A. Eyal et al.

Signal Distortion and Noise in AM-SCM Transmission Systems Employing the Feedfrorward Linearized MQW-EA External Modulator, Journal of Lightwave Technology, vol. 15, No. 8, Au.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

H. Gysel et al. "Electrical Predistortion to Compensate for Combined Effect of Laser Chirp and Fibre Dispersion", Electronics Letters IEE Stevenage vol. 27, No. 5, Feb 1991,.

A. Mecozzi et al. "Cancellation of timing and Amplitude Jitter in Symmetric Links Using Highly Dispersed Pulses", IEEE Photonics Technology Letters, vol. 13, No. 5, May 2001.

Ram Sadhwani, Adaptive CMOS Predistortion Linearizer for Fiber-Optic Links, Journal of Lightwave Technology, vol. 21, No. 12, Dec. 2003.

P.S. Andre, et al., "Extraction of DFB Laser Rate Equation Parameters for Optical Simulation Pusposes", Conftele 1999 ISBN 972-98115-0-4.

Lucas Illing, et al., "Shaping Current Waveforms for Direct Modulation of Semiconductor Lasers", Institute for Nonlinear Science, U.C. San Diego, 2003.

P.M. Watts, et al., "Demonstration of Electrical Dispersion Compensation of Single Sideband Optical Transmission", London Communications Symposium 2003, University College Lon.

Hoon Kim, et al., "10 Gbit/s 177 km transmission over conventional singlemode fibre using a vestigial side-band modulation format" Electronics Letters, vol. 37, No. 25 Dec. 6, 2001 pp. 1533-1534.

Henning Bulow, et al., "Disperssion Mitigation Using a Fiber-Bragg-Grating Sideband Filter and a Tunable Electronic Equalizer", Optical Society of America, 2000.

M. Sieben, et al., "10Gbit/s optical single sideband system" Electronics Letters, vol. 33, No. 11, May 22, 1997, pp. 971-973.

Feldhaus G., "Voltera Equalizer for Electrical Compensation of Dispersion and Fiber Nonlinearities", Journal of Optical Communicatinos, Fachverlag Schiele & Schon, Berlin, De, vol. 23, No. 3, Jun. 2002, pp. 82-84, XP001130377, ISSN: 0173-4911.

Schaffer, Troy A. et al "A 2GHz 12-bit Digital-to-Analog Converter for Direct Digital Synthesis Applications", GaAs IC Symposium, pp. 61-64.

Kamoto, T. et al "An 8-bit 2-ns Monolithic DAC", IEEE Journal of Solid-State Circuits, Feb. 1988, vol. 23, No. 1.

\* cited by examiner

Figure 1c
(PriorArt)
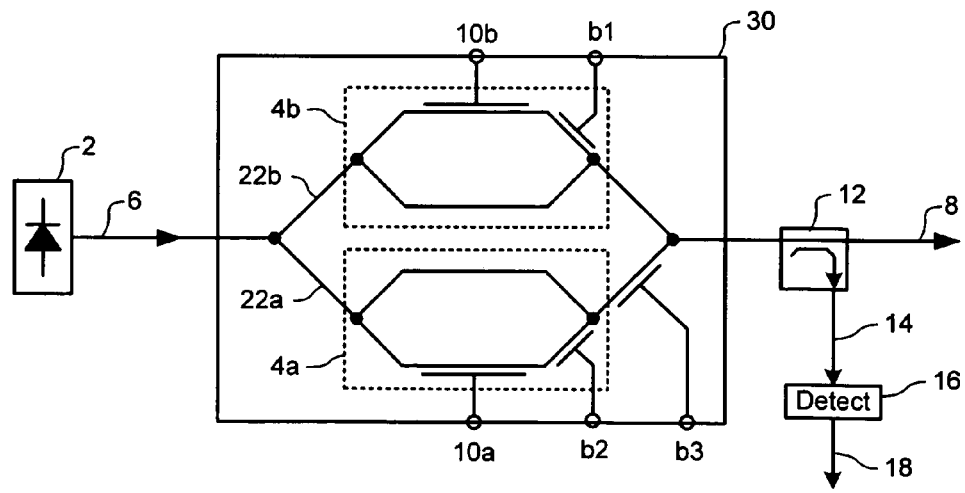

Figure 3
(PriorArt)
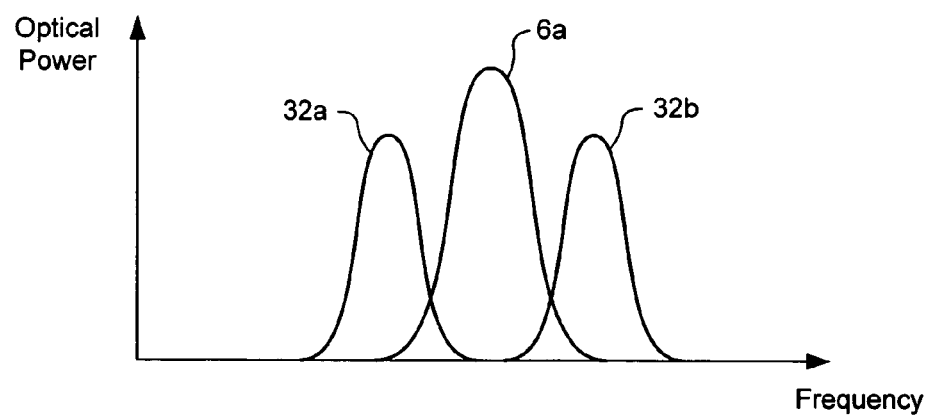

METHOD FOR OPTICAL CARRIER SUPPRESSION AND QUADRATURE CONTROL

CROSS-REFERENCE TO RELATED APPLICATIONS

This is the first application filed for the present invention.

BACKGROUND OF THE INVENTION

Microfiche Appendix

Not Applicable.

Technical Field

The present invention relates to optical signal transmitters for optical communications systems, and in particular to optical transmission carrier suppression in optical communications systems.

In the optical communications space, various techniques are used to synthesize an optical communications signal for transmission. A popular technique utilizes a laser 2 coupled to an external optical modulator 4, as shown in FIG. 1a. The laser 2 generates a narrow-band continuous wave (CW) optical carrier signal 6 having a desired wavelength. The optical modulator 4 operates to modulate the amplitude and/or phase the carrier signal 6 to generate the optical communications signal 8 using a drive signal 10 that encodes data to be transmitted. Typically, an optical coupler 12 at the output of the optical modulator 4 taps the communications signal 8, and supplies the tapped signal 14 to a conventional photodetector 16. The detection signal 18 output by the photodetector 16 provides a feed-back signal that is used by control circuits (not shown) to monitor and optimize performance of both the laser 2 and modulator 4.

In the arrangement illustrated in FIG. 1a, the optical modulator 4 is provided by a Mach-Zehnder (MZ) modulator. Other types of modulators may be used, depending on the desired type of modulation. For example, an electro-absorptive modulator (EAM) or a variable optical attenuator may be used for amplitude modulation; whereas phase shifters are well known for implementing phase modulation. In the case of a Mach-Zehnder modulator, the drive signal 10 and a DC bias 20 are used to control a differential phase delay experienced by light traversing the two branches 22a,b of the modulator, via the well known electro-optical effect. The optical power of the recombined lightwave (communications signal 8) emerging from the MZ modulator varies sinusoidally with the phase angle between the beams traversing to two branches 22, and thus can be controlled by the drive and bias signals 10 and 20. As such, the MZ modulator displays a sinusoidal response to the applied input voltage as shown in FIG. 2.

In operation, the DC bias signal 20 is used to drive the modulator to a bias point 24 corresponding to an inflection point of the response curve (which normally corresponds to a phase difference of 90 degrees between the beams transiting the two branches of the MZ modulator). The drive signal 10, which carries the data being transmitted, can then drive excursions of the phase difference between 0 and 180 degrees, corresponding to maximum and minimum transmittance, respectively. This operation is typically employed in communications networks to implement On—Off—Keying (OOK) transmission protocols.

In theory, a phase difference of 180 degrees causes perfect destructive interference between the two light beams, resulting in total extinction of the communications signal 8 at the output of the modulator. However, in practice, manufacturing defects and other impairments mean that total extinction is rarely achieved. At least some light "leaks" through the modulator 4, and appears in the communications signal 8 as optical power at the carrier signal wavelength. In the modulator response curve (see FIG. 2a) this "leakage" 26 manifests itself as a non-zero optical power at the minimum transmittance point 28.

FIG. 1b illustrates a variant of the MZ modulator of FIG. 1a, in which both branches of the MZ modulator can be independently driven using respective drive signals 10a and 10b. Differently driving both branches 22 of the MZ modulator (i.e., one drive signal 10a is the inverse of the other drive signal 10b) provides the same amplitude modulation functionality as that described above with reference to FIG. 1a, but at lower voltage levels. Chirp in the recombined lightwave (communications signal 8) emerging from the MZ modulator can be controlled by applying a scaling factor to one (or both) of the differential drive signals 10a, 10b.

FIG. 1c shows a complex optical modulator 30 composed of three nested MZ modulators. Thus, the CW carrier signal 6 from the laser 2 is divided into two branches 22a and 22b of an "outer" MZ modulator. Each branch 22a,b of the of outer MZ modulator includes a respective "branch" MZ modulator 4a,b of the type described above with reference to either of FIGS. 1a and 1b. Such devices are commercially available, and provide a convenient hardware means of implementing independent phase and amplitude modulation of the CW carrier 6. Some commercially available devices include an integral optical tap 12 and photodetector 16 to facilitate monitoring of device operation. The nested MZ modulator architecture of FIG. 1c enables use of complex modulation schemes, such as Quadrature Phase shift Keying (QPSK).

In all of these cases, the (or each) modulator 4, 30 is driven to a bias point 24 corresponding to an inflection point of its response curve (see FIG. 2), so that the drive signal(s) 10 can induce appropriate amplitude and/or phase excursions to encode data onto the carrier signal 6. A limitation of this approach is that the optical power of the communications signal 8 is distributed between a residual carrier signal 6a and a pair of side-bands 32a,b, as shown in FIG. 3. The energy of the residual carrier signal 6a (hereinafter simply "carrier 6a") is the result of contributions from both the bias point 24 (since it represents a "DC-offset" of the sinusoidal response curve) and leakage 26 at the minimum transmittance point. The side-bands 32 contain the frequency-content of the drive signal(s) 10, and thus represent the encoded data being conveyed by the communications signal 8. Because the carrier 6a does not contain encoded data, it is effectively redundant for communications purposes. However, the optical energy of the carrier 6a reduces the energy within the side-bands 32, and increases optical impairments within the communications system. Both of these factors reduce signal reach.

Accordingly, methods and apparatus for synthesizing an optical communications signal in which the carrier is suppressed, would be highly desirable.

SUMMARY OF THE INVENTION

Accordingly, an object of the present invention is to provide methods and apparatus for synthesizing a suppressed carrier optical communications signal.

Thus, and aspect of the present invention provides a method for synthesizing suppressed carrier optical communications signals. According to the invention, an optical modulator capable of complex modulation of an optical carrier signal is driven (biased) to a bias point near a zero-crossing point of the modulator's E-field response. A complex input signal is then used to drive excursions of the E-field response to impress the input signal onto the optical carrier. The resulting lightwave emerging from the complex modulator exhibits an optical spectrum characterised by a pair of sidebands and a strongly suppressed carrier. Bias control of the complex modulator is implemented on the basis of the optical power detected at the output of the complex modulator. This enables the optical modulator to be treated as a "black box", in that calculation of the bias signals does not relay on knowledge of the precise performance characteristics of the modulator.

BRIEF DESCRIPTION OF THE DRAWINGS

Further features and advantages of the present invention will become apparent from the following detailed description, taken in combination with the appended drawings, in which:

FIGS. 1a-1c schematically illustrate communications signal synthesizers known in the prior art;

FIG. 3 shows a typical spectrum of the optical communications signal generated by the synthesizers of FIGS. 1a-1c;

FIG. 7 schematically illustrates principal elements and operation of a complex driver circuit usable in the embodiment of FIG 4a.

It will be noted that throughout the appended drawings, like features are identified by like reference numerals.

DETAILED DESCRIPTION OF THE PREFERRED EMBODIMENT

The present invention provides methods and systems for synthesizing suppressed carrier optical communications signals. Embodiments of the invention are described below, by way of example only, with reference to FIGS. 4-8.

Figure 4A:
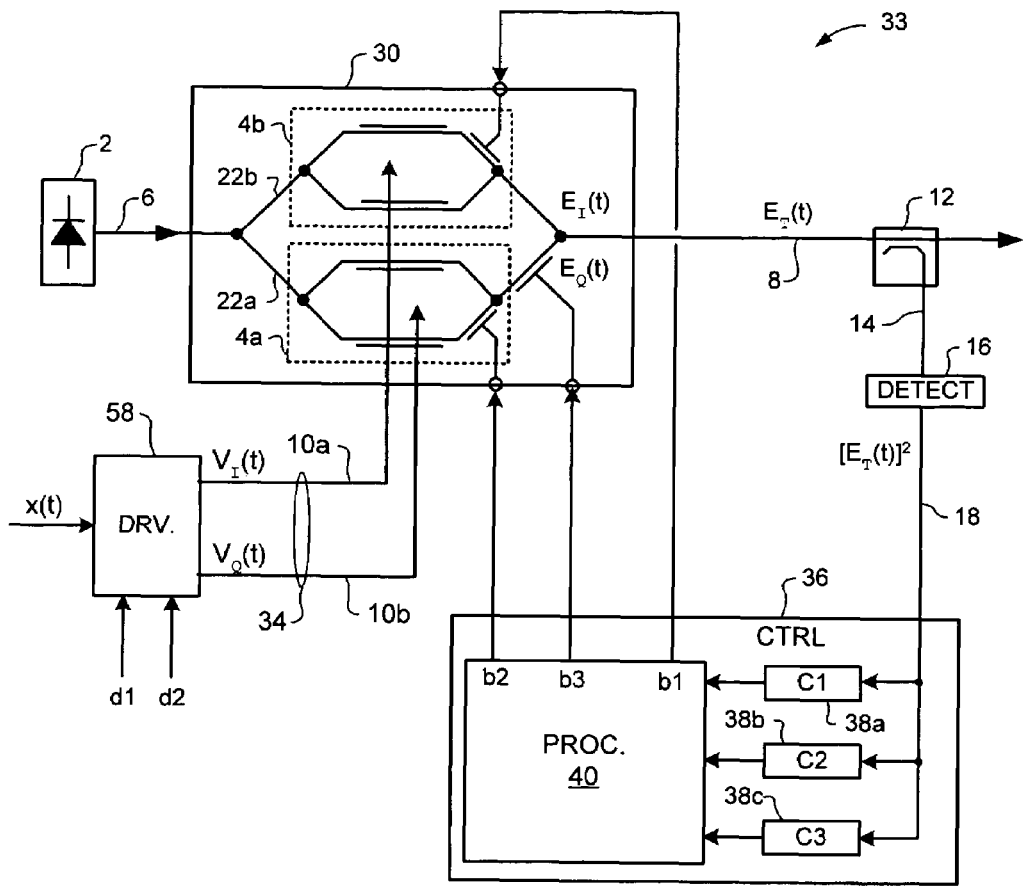
FIGS. 4a and 4b schematically illustrate principal elements an operation of a system for synthesizing suppressed carrier optical communications signals, in accordance with respective embodiments of the present invention.

In broad terms, the present invention provides a synthesizer system 33 comprising a complex optical modulator 30 and a controller 36, as shown in FIG. 4a. In operation, the controller 36 drives the complex modulator 30 to a bias point near a zero-crossing point of the modulator's E-field response. A complex input signal 34 is then used to drive excursions of the E-field response about the bias point. Embodiments of the invention may also include a complex driver 58 for generating the complex input signal 34 based on a binary input signal x(t) (which may, for example, be a serial bit stream), as will be described below with reference to FIGS. 7 and 8.

Figure 1A:
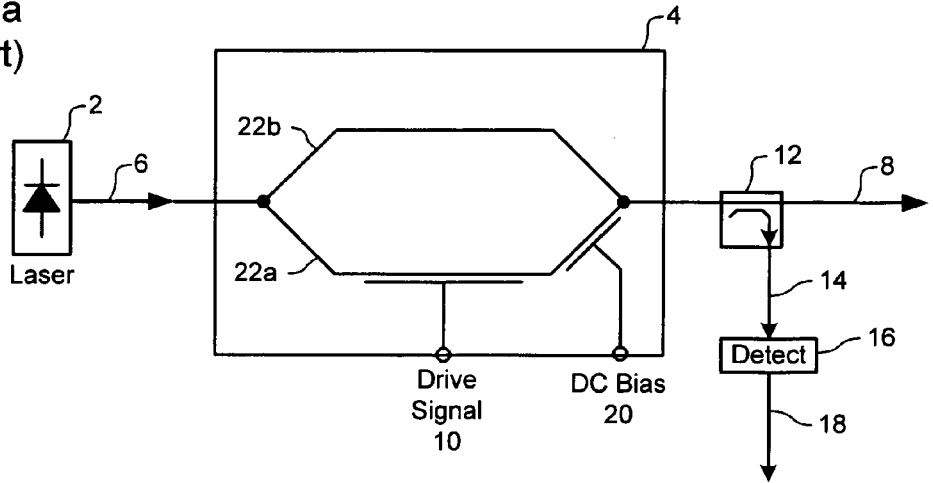
Figure 1B:
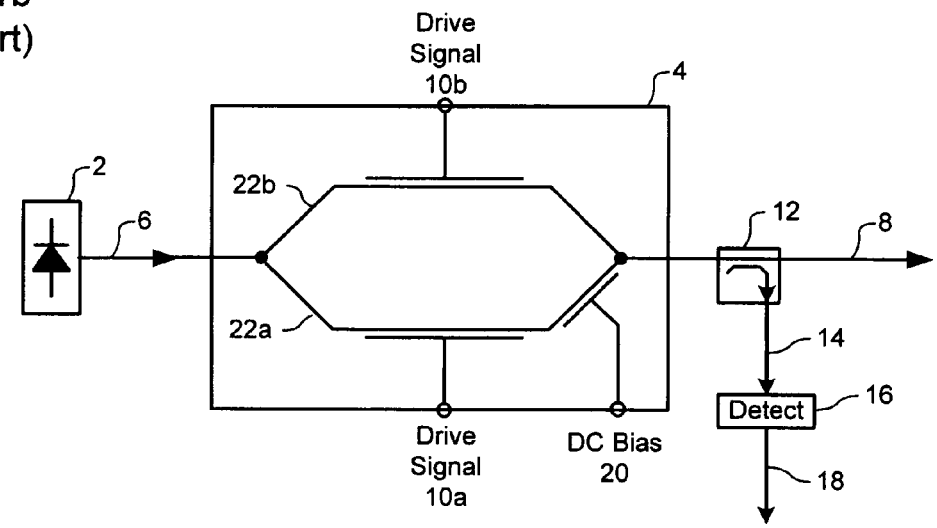
Figure 2:
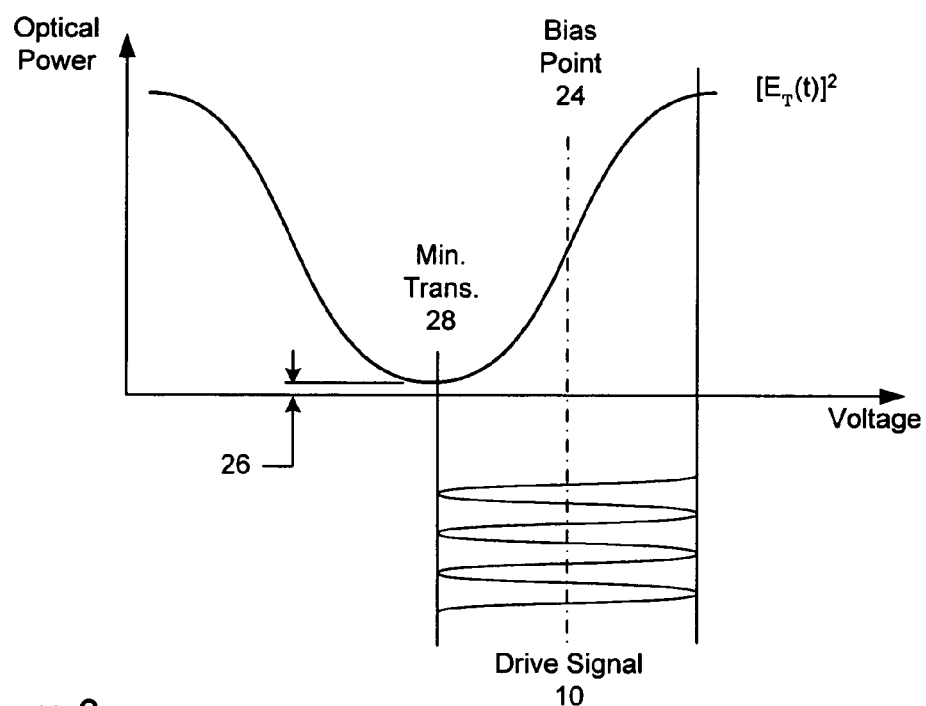
FIG. 2 illustrates typical response of the synthesizers of FIGS. 1a-1c.

As shown in FIG. 4a, the complex optical modulator may conveniently be provided by a conventional "nested" Mach-Zehnder modulator architecture of the type described above with reference to FIG. 1c.

As described above, the optical tap 12 and detector 16 may be provided by a conventional optical coupler (e.g. a 20 dB coupler) and a photodetector 16. With this arrangement, a small portion of the communications signal $E_T(t)$ 8 emerging from the complex optical modulator 30 is tapped and supplied to the photodetector 16, the output of which is an electrical detector signal 18 (typically a current) proportional to the optical power $[E_T(t)]^2$. The detector signal 18 is supplied to the controller 36, and used to determine the level of bias signals b1-b3 for controlling the bias point of the complex optical modulator 30, as will be described in greater detail below.

Figure 4B:
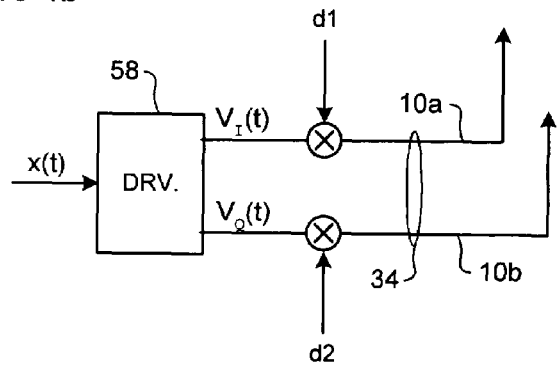
Figure 5:
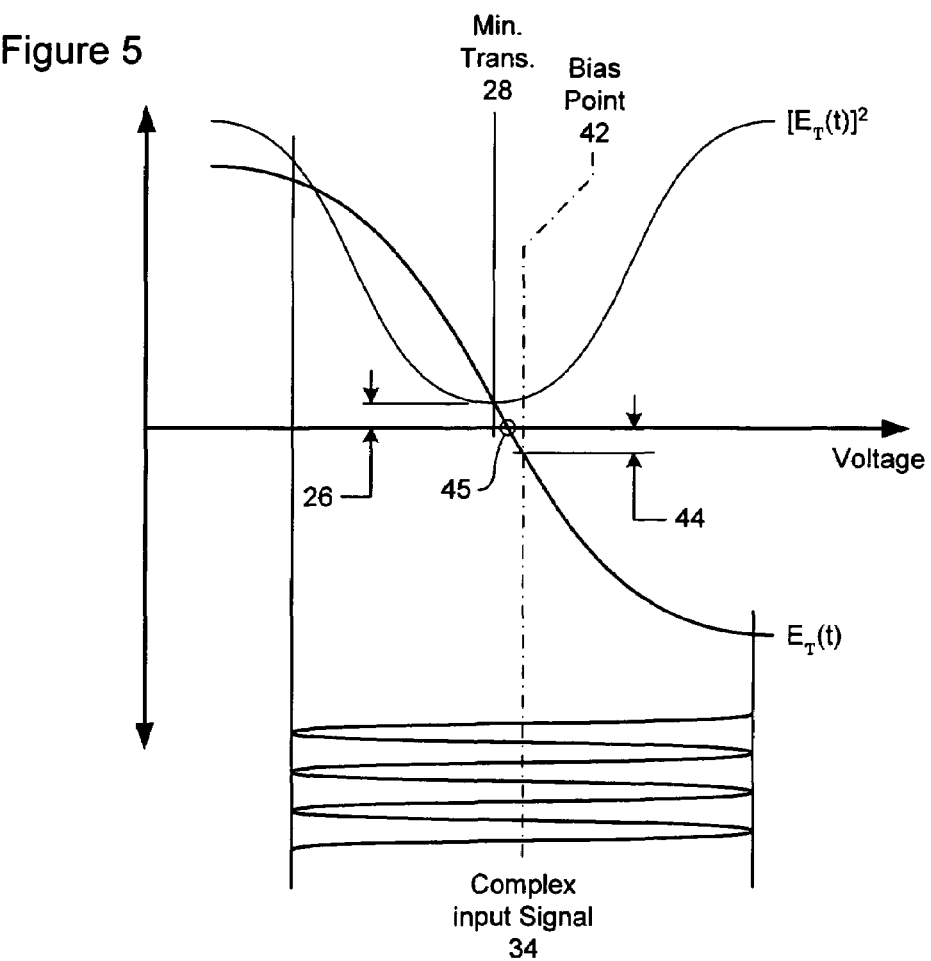
FIG. 5 illustrates typical response of the system of FIGS. 4a and 4b.
Figure 6:
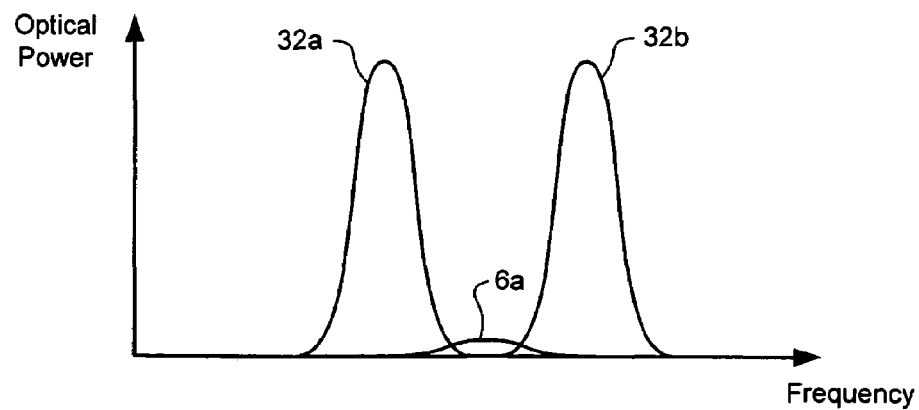
FIG. 6 shows a typical spectrum of the optical communications signal generated by the system of FIGS. 4a and 4b.

The format of the complex input signal 34 will normally be selected to take best advantage of the architecture of complex modulator 30. In the embodiment of FIG. 4, a nested MZ modulator architecture is used. With this architecture, the communications signal 8 is generated by summation of the modulated light emerging from each of the branch modulators 4a,4b. This architecture is particularly suited to being driven by a complex input signal 34 in the form of a pair of Cartesian coordinate signal components 10, such as, for example, In-Phase and Quadrature signal components $V_I(t)$ 10a and $V_Q(t)$ 10b. The signal components $V_I(t)$ 10a and $V_Q(t)$ 10b each include a unique low frequency (on the order of a few hundred Hertz) dither signal, d1 and d2 respectively. In the embodiment of FIG. 4a, the dithers d1 and d2 are inserted into the signal components $V_I(t)$ 10a and $V_Q(t)$ 10b by complex driver 58. This embodiment is described in greater detail below with reference to FIG. 7. FIG. 4b illustrates an alternative arrangement, in which the dithers d1 and d2 are inserted into the signal components $V_I(t)$ 10a and $V_Q(t)$ 10b downstream of the complex driver 58. In either case, each of the signal components may be provided as a single signal (e.g. referenced to ground) or by a differential signal pair, as desired, and are used to drive respective branch MZ modulators 4a,4b of the complex optical modulator 30. With this arrangement, the signal components $V_I(t)$ 10a and $V_Q(t)$ 10b will be impressed onto the light traversing each respective branch 22a,22b of the complex modulator 30 to generate branch optical signals $E_I(t)$ and $E_Q(t)$. The branch optical signals are recombined at the output of the complex modulator 30 to generate the communications signal 8 in which the E-field $E_T(t)$ may be described by an equation of the form:

$$E_T(t) = E_I(t) + jE_Q(t)e^{j\theta q} \quad \text{(Eq. 1)}$$

where: $\theta q$ is the phase difference (angle) between $E_I(t)$ and $E_Q(t)$. With this formation, the optical power $[E_T(t)]^2$ detected by the photodetector 16 will be given by:

$$|E_T(t)|^2 = E_I(t)^2 + E_Q(t)^2 - 2E_I(t)E_Q(t)\sin(\theta q) \quad \text{(Eq. 2)}$$

As mentioned above, the complex optical modulator 30 is driven (biased) by the controller 36 to a bias point near a zero crossing point of the E-field response of the complex optical modulator 30. In the embodiment of FIG. 4, three bias signals b1-b3 are used for this purpose. Bias signals b1 and b2 control respective bias points of the branch MZ modulators 4a,4b. The third bias signal, b3, controls the phase difference (θq) between $E_T(t)$ and $E_Q(t)$, and thus the bias point of the "outer" MZ modulator. In the embodiment of FIG. 4, the bias signals b1-b3 are supplied to respective bias signal input pins of the complex optical modulator 30.

With the dithers d1 and d2 included in branch signals $E_I(t)$ and $E_Q(t)$, respectively, the optical power $[E_T(t)]^2$ detected by the photodetector 16 will be given by:

$$|E_T(t)|^2 = [d_I(t)^2 + 2E_I(t)d_I(t) + E_I(t)^2] + [d_Q(t)^2 + 2E_Q(t)d_Q(t) + E_Q(t)^2] - 2\sin(\theta q)[d_I(t)d_Q(t) + E_Q(t)(d_I(t) + E_I(t)d_Q(t) + E_Q(t)E_I(t)]$$ (Eq. 3)

As will be appreciated, $E_I(t)$ and $E_Q(t)$ are dominated by high-frequency components related to the line rate (e.g. 10 Gb/sec) of the optical communications system. For the purposes of the present invention, however, we are interested in low frequency dither components of the optical power $[E_T(t)]^2$, corresponding to the bias signals b1-b3. Under these conditions, Equation 3 above can be simplified by replacing $E_I(t)$ and $E_Q(t)$ by their respective mean values $m_I$ and $m_Q$ to yield:

$$|E_T(t)|^2 = d_I(t)^2 + 2m_I d_I(t) + m^2_I + [d_Q(t)^2 + 2m_Q d_Q(t) + m^2_Q] - 2\sin(\theta q)[d_I(t)d_Q(t) + m_Q d_I(t) + m_I d_Q(t) + m_Q m_I]$$ (Eq. 4)

where: $d_I(t)$ and $d_I(t)^2$ are the first and second harmonics, respectively, of dither d1; and $d_Q(t)$ and $d_Q(t)^2$ are the first and second harmonics, respectively, of dither d2; and $d_I(t) d_Q(t)$ is the beat frequency of dithers d1 and d2 are unique, and known, it is a simple matter to detect the first harmonics $d_I(t)$ and $d_Q(t)$, and the beat frequency component $d_I(t) d_Q(t)$ in the optical power $[E_T(t)]^2$ detected by the photodetector 16. Thus, the controller 36 includes a respective correlator filter 38a, 38b, 38c for detecting a level of each of $d_I(t)$, $d_Q(t)$ and $d_I(t)d_Q(t)$. The output of each correlator filter is then supplied to a processor 40 which uses this information to adjust respective values of each of the bias signals b1-b3.

Carrier suppression occurs when the mean values $m_I$ and $m_Q$ are zero. As can be seen from Equation 4, when the mean values $m_I$ and $m_Q$ are zero, then the first harmonics $d_I(t)$ and $d_Q(t)$ will not be present in the detector signal 18. In general, the method of the invention is to step bias signal d3 to ensure quadrature, and then step bias signals b1 and b2 such that the detected harmonics $d_I(t)$ and $d_Q(t)$ are minimized. This is equivalent to minimizing the optical E field means $m_I m_Q$, which implies maximizing carrier suppression. As may be appreciated, this control approach uses features explicitly in the optical E field, rather than features explicitly in the electro-optic transfer function. This means the control is more robust to physical device variations.

More particularly, in order to maintain quadrature, the phase difference θq between $E_T(t)$ and $E_Q(t)$ must be zero, in which case $\sin(\theta q)=0$ and $2\sin(\theta q)d_I(t)d_Q(t)$ will be a minimum (ideally zero), independent of the detected levels of $d_I(t)^2$ and $d_Q(t)^2$. Since the phase difference θq can be directly controlled by the bias signal b3, the processor 40 operates to adjust the value of bias signal b3 to minimize the detected level of the beat frequency component $d_I(t)d_Q(t)$, and thereby ensure quadrature. Preferably, the values of bias signals b1 and b2 will be held constant during adjustment of bias signal b3.

The first harmonic signals $d_I(t)$ and $d_Q(t)$ are independently controllable by the bias signals b1 and b2, respectively. Accordingly, the processor can operate to adjust bias signal b1 to minimize the detected level of $d_I(t)$; and adjust bias signal b2 to minimize the detected level of $d_Q(t)$.

Figure 7:
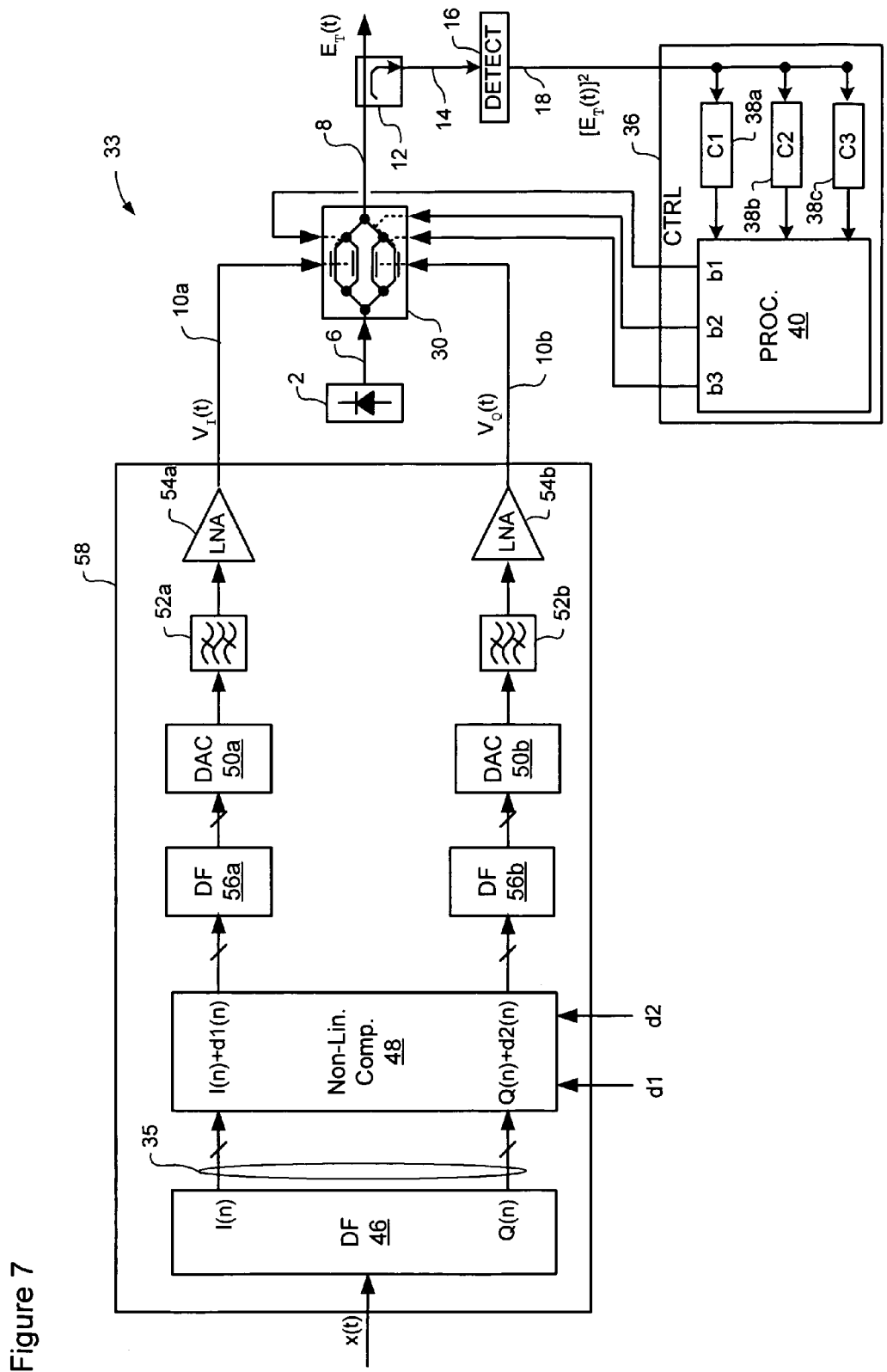

As mentioned previously, FIG. 4 illustrates an embodiment in which the drive signals $V_I(t)$ and $V_Q(t)$ forming the complex input signal 34 include dithers d1 and d2. FIG. 7 shows a block diagram illustrating a complex driver circuit which provides a practical implementation of this approach.

In the embodiment of FIG. 7, a digital input signal x(t), which may be in the form of a serial bit stream, is supplied to a digital filter 46, which implements a mapping function to generate corresponding In-phase and quadrature values I(n) and Q(n) of the complex input signal 34. If desired, the digital filter 46 may also implement a compensation function to electrically pre-compensate impairments of the optical communications system. This functionality is described in detail in application's co-pending U.S. patent applications Ser. Nos. 10/262,944 filed Oct. 3, 2002; 10/307,466 filed Dec. 2, 2002; 10/405,236 filed Apr. 3, 2003, and International Patent Application No. PCT/CA03/01044 filed Jul. 11, 2003. Various known digital filter types may be used to implement the digital filter 46, such as, for example, a Random Access Memory Look-up Table (RAM LUT). Alternatively, the digital filter 46 may be implemented using Finite Impulse Response (FIR) filters, Infinite Impulse Response (IIR) filters, and Fast Fourier Transform (FFT) filters). In either case, the digital filter 46 generates the In-phase and quadrature signal component values I(n) and Q(n) 35 at a sample rate which is about double the bit-rate of the input signal x(t). A non-linear compensator 48 (which may also be implemented as a RAM LUT) is used to adjust the value of each successive sample I(n) and Q(n), by digitally adding successive dither values d1(n) of dither signal d1, and dither values d2(n) of dither signal d2, respectively. The non-linear compensator 48 may also be used to compensate non-linear performance of the complex modulator 30, as described in applicant's co-pending U.S. patent applications Ser. No. 10/262,944, filed Oct. 3, 2002; and 10/457,528 filed Jun 10, 2003 entitled "High Speed Digital-to Analog Converter"; and International Patent Application No. PCT/CA03/01044 filed Jul. 11, 2003. The non-linear compensator 48 may be implemented as a separate device cascaded with the digital filter 46, as shown in FIG. 7, or may be "embedded" within the digital filter 46 by applying the dither signals d1 and d2 (and any other mapping function implemented by the non-linear compensator 48) to the digital filter 46.

Respective high-speed Digital-to-Analog Converters (DACs) 50a, 50b can then be used to convert the sample values into corresponding analog signals. A high-speed DAC suitable for this purpose is known from applicant's co-pending U.S. patent application Ser. No. 10/457,528 filed Jun. 10, 2003. If desired, the analog signals can be conditioned, for example by means of respective filters 52a, 52b and low noise amplifiers (LNA) 54a, 54b, in a conventional manner, to remove out-of-band noise and to scale the signal amplitude to the dynamic range of the complex modulator 30.

As may be appreciated, the effects of the independent DACs 50a, 50b, the filters 52a, 52b and the LNAs 54a, 54b for each signal component may cause differential propagation delays between the non-linear compensator 48 and the optical modulator 30. Such differential delay can be compensated by means of digital filters 56a, 56b located in at least one of the signal paths. Each digital filter 56a, 56b can be controlled in a known manner to impose a selected delay, which is calculated to compensate for the differential propagation delays experienced by each of the signal components.

As describe above, the bias signals b1-b3 are calculated from the optical power $[E_T(t)]^2$ detected by the photodetector 16. The optical power $[E_T(t)]^2$ at the output of the complex modulator 30 inherently also includes any effects due to the design and performance characteristics of the of the complex modulator 30. Consequently, the method of the invention automatically selects means values for the bias signals b1-b3 which account for these effects, by driving the modulator 30 to a bias point 42 which ensures quadrature and minimizes leakage. An advantage of this method is that it enables the optical modulator 30 to be treated as a "black box", in that a generic algorithm can be developed for calculation of the bias signals b1-b3, without specific knowledge of the precise performance characteristics of the complex modulator 30.

In the embodiments of FIGS. 4-7, the complex optical modulator 30 is provided using a set of three nested Mach-Zehnder modulators, which is capable of performing complex modulation of the carrier signal 6 when driven by a pair of Cartesian coordinate (e.g. in-phase and Quadrature) signal components. Equations 2-5 above were derived in light of this architecture. However, it will be appreciated that equivalent functionality can be implemented using any optical modulator capable of performing complex modulation of an optical carrier signal 6.

Figure 8:
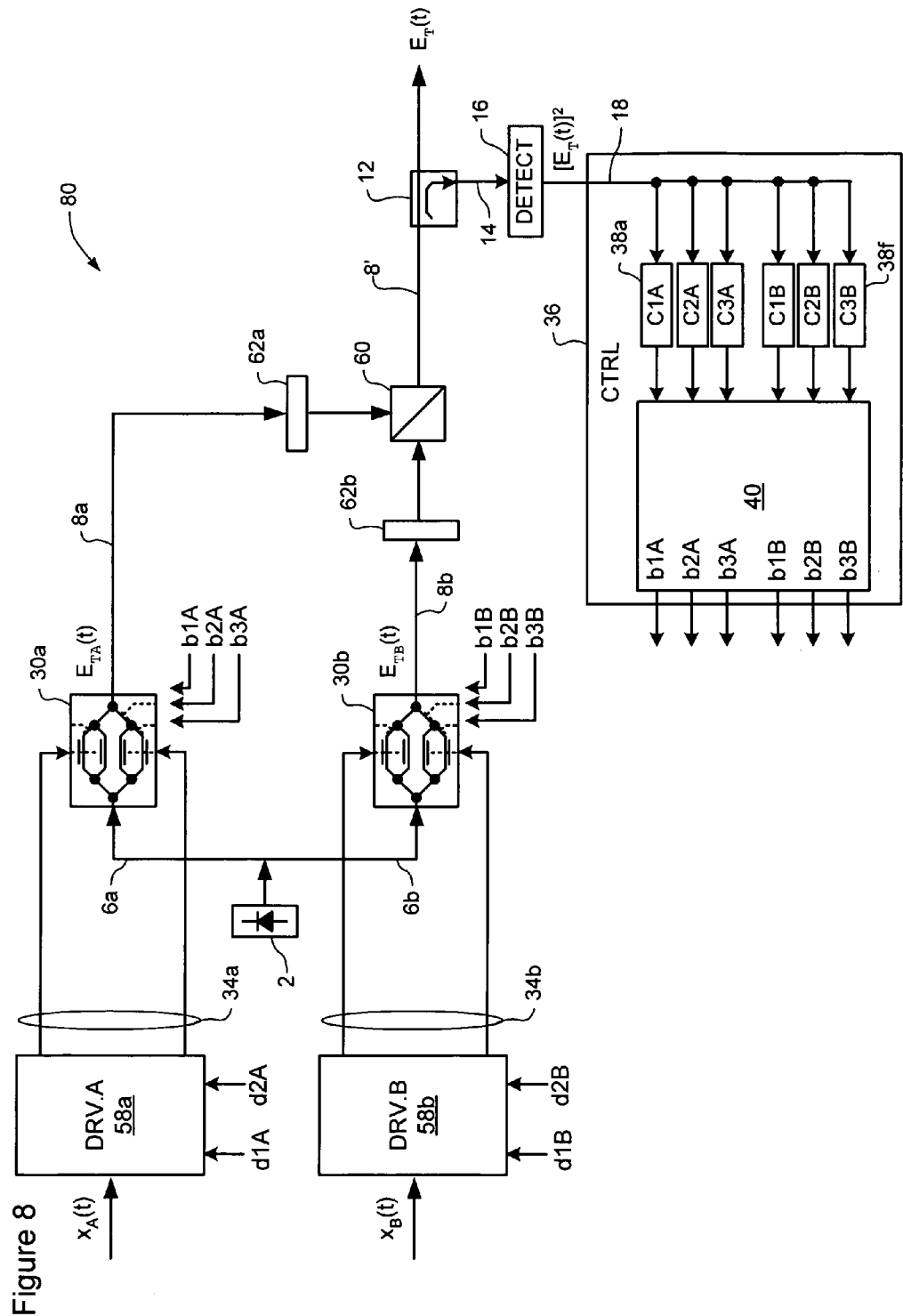
FIG. 8 schematically illustrates principal elements an operation of a system for synthesizing suppressed carrier optical communications signals, in accordance with a third embodiment of the present invention.

Referring now to FIG. 8, there is shown an embodiment of a system 80 in accordance with the invention which generates a carrier suppressed polarization-interleaved communications signal 8'. In this case, a pair of parallel synthesizers 33a and 33b are provided, each of which comprises a respective complex driver 58 and complex modulator 30, which operate as described above with respect to FIGS. 4-7 to generate a respective carrier-suppressed optical signals 8a, 8b. A respective input signal $x_A(t)$ and $x_B(t)$ is supplied to each synthesizer 33. These input signals may be independent data streams or may be derived from a single data stream. A common narrow band laser 2 may be used for both synthesizers 33a,b, as shown in FIG. 8, although separate lasers may also be used if desired. In either case, both synthesizers 33a,b operate at the same CW signal wavelength.

The polarization interleaved communications signal 8' is generated by combining the carrier-suppressed optical signals 8a, 8b using a polarization combiner 60. Respective polarization rotators 62a, 62b ensure orthogonal polarization states of the carrier-suppressed optical signals 8a, 8b. This ensures that the two carrier-suppressed optical signals 8a, 8b are fully orthogonal, and thus can be combined into the polarization-interleaved communications signal 8' without interference. As may be appreciated, because the optical signals 8a, 8b generated by the synthesizers 33a, 33b are carrier suppressed, the polarization-interleaved communications signal 8' will also be carrier suppressed.

If desired, each synthesizer 33a, 33b may be provided with a respective, independent controller 36 operating as described above with reference to FIGS. 4-6. However, this solution also requires respective taps 12 and photo-detectors 16 for each synthesizer 33, which increases costs, signal noise, and sources of error. Accordingly, a single controller 82 is preferably used to control the bias point of both synthesizers 33a and 33b. This is a signal coupler 12 taps the polarization-interleaved communications signal 8'. The resulting tap signal 14 is supplied to a photo-detector 18, which generates a corresponding detection signal 18. Because the photodetector is substantially polarization insensitive, the optical power $[E_T(t)]^2$ detected by the photodetector 16 will be given by:

$$|E_T(t)|^2 = |E_{TA}(t)|^2 + |E_{TB}(t)|^2 \quad \text{(Eq. 6)}$$

Where $[E_{TA}(t)]^2$ and $[E_{TB}(t)]^2$ follow equation 2 above. Because $E_{TA}(t)$ and $E_{TB}(t)$ are orthogonal, each signal will be substantially free of interference components from the other signal. Accordingly, each signal will contain respective first harmonics $d_I(t)$ and $d_Q(t)$ and beat signal $d_I(t) d_Q(t)$, as described above. The frequencies of each of these components are determined by the dither signals d1 and d2 added to the respective drive signals 34 of each synthesizer. As such, they can be readily isolated by the simple expedient of ensuring that all four of the dither signals (d1A, d2A, d1B and d2B) have unique frequencies. With this arrangement, each component (of both signals 8a and 8b) can be detected by a respective correlator 38. The processor can then use the correlator outputs to drive the respective bias signals b1-b3 for both synthesizers 33.

Thus it will be seen that the present invention provides methods and apparatus for synthesizing suppressed carrier optical communications signals. According to the invention, an optical modulator capable of complex modulation of an optical carrier signal is driven (biased) to a bias point near a zero-crossing point of the modulator's E-field response. A complete input signal is then used to drive excursions of the E-field response to impress the input signal onto the optical carrier. The resulting lightwave emerging from the complex modulator exhibits an optical spectrum characterised by a pair of sidebands and a strongly suppressed carrier. Bias control of the complex modulator is implemented on the basis of the optical power detected at the output of the complex modulator. This enables the optical modulator to be treated as a "black box", in that calculation of the bias signals does not relay on knowledge of the precise performance characteristics of the modulator.

The embodiment(s) of the invention described above is (are) intended to be exemplary only. The scope of the invention is therefore intended to be limited solely by the scope of the appended claims.

We claim:

1. A method of synthesizing a suppressed carrier optical communications signal, the method comprising the steps of:
   providing an optical modulator adapted for complex modulation of a continuous wave (CW) optical signal;
   biasing the optical modulator to a bias point proximal a zero-crossing point of an E-field response of the modulator, wherein the bias point is offset from the zero-crossing point, a magnitude and direction of the offset being selected so as to at least partially cancel leakage of the CW optical signal through the optical modulator; and
   driving excursions of the E-field response about the bias point using a complex input signal.

2. A method as claimed in claim 1, wherein the optical modulator comprises a nested Mach-Zehnder architecture capable of independently modulating phase and amplitude of the CW optical signal.

3. A method as claimed in claim 1, wherein the complex input signal comprises a pair of orthogonal signal components.

4. A method as claimed in claim 3, wherein the pair of orthogonal signal components comprise an In-phase signal component $V_I(t)$ and a Quadrature signal component $V_Q(t)$.

5. A method as claimed in claim 4, wherein the optical modulator comprises an outer Mach-Zehnder modulator having a pair of parallel branches, each branch including a respective branch Mach-Zehnder modulator, and wherein the step of driving excursions of the E-field response comprises a step of driving each of the branch Mach-Zehnder modulators using a respective one of the In-phase and Quadrature signal components.

6. A method as claimed in claim 5, wherein the step of biasing the optical modulator comprises steps of:
- inserting a respective dither signal into each of the orthogonal signal components, each dither signal having a respective unique frequency;
- detecting signal components of the suppressed carrier optical communications signal corresponding to the dither signals; and
- adjusting the bias point of the optical modulator using the detected components.

7. A method as claimed in claim 6, wherein the step of detecting signal components of the suppressed carrier optical communications signal comprises a steps of:
- detecting a first signal component $[d_I(t)]^2$ having a frequency corresponding to that of a first one of the dither signals;
- detecting a first signal component $[d_Q(t)]^2$ having a frequency corresponding to that of a second one of the dither signals; and
- detecting a beat-frequency component $2\mathrm{Sin}(\theta q)d_I(t)d_Q(t)$ having a frequency corresponding to a beat frequency of the first and second dither signals.

8. A method as claimed in claim 7, wherein the step of adjusting the bias point of the optical modulator comprises steps of:
- adjusting a phase angle between optical signals traversing the branches of the outer Mach-Zehnder modulator to minimize an optical power of the beat-frequency component;
- adjusting respective values of the first and second dither signals to minimize an optical power of the corresponding first and second signal components $[d_I(t)]^2$ and $[d_Q(t)]^2$.

* * * * *